United States Patent
Benisty et al.

(10) Patent No.: US 11,449,428 B2
(45) Date of Patent: Sep. 20, 2022

(54) ENHANCED READ-AHEAD CAPABILITY FOR STORAGE DEVICES

(71) Applicant: Western Digital Technologies, Inc., San Jose, CA (US)

(72) Inventors: Shay Benisty, Beer Sheeva (IL); Ariel Navon, Revava (IL); Tomer Eliash, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 100 days.

(21) Appl. No.: 17/017,626

(22) Filed: Sep. 10, 2020

(65) Prior Publication Data

US 2020/0409852 A1 Dec. 31, 2020

Related U.S. Application Data

(63) Continuation-in-part of application No. 16/012,311, filed on Jun. 19, 2018, now Pat. No. 11,188,256.

(51) Int. Cl.
*G06F 12/0862* (2016.01)
*G06F 3/06* (2006.01)

(52) U.S. Cl.
CPC ........ *G06F 12/0862* (2013.01); *G06F 3/0604* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,775,742 B2 | 7/2014 | Devvuru | |
| 10,642,502 B2 | 5/2020 | Sharon et al. | |
| 10,649,776 B2 | 5/2020 | Navon et al. | |
| 10,719,445 B1 | 7/2020 | Navon et al. | |
| 10,725,781 B1 | 7/2020 | Avraham et al. | |
| 10,732,848 B2 | 8/2020 | Navon et al. | |
| 2010/0005452 A1 | 1/2010 | Anson et al. | |
| 2011/0173398 A1 | 7/2011 | Boyle et al. | |
| 2013/0138867 A1* | 5/2013 | Craft ................ G06F 3/061 |
| | | | 711/E12.008 |

(Continued)

OTHER PUBLICATIONS

Navon, Ariel, U.S. Appl. No. 16/259,481, filed Jan. 28, 2019.
Ganesh, Guruswamy et al., U.S. Appl. No. 16/454,850, filed Jun. 27, 2019.

*Primary Examiner* — Jared I Rutz
*Assistant Examiner* — Marwan Ayash

(57) ABSTRACT

In the context of data storage, an approach to pre-fetching data prior to a read request involves receiving a read request and a next read request, and updating metadata corresponding to the read request with a next data storage address corresponding to the next read request. Responsive to again receiving the read request at a later time, the next data storage address can be read from the read request metadata and the next data can be pre-fetched from the next data storage address in advance of processing a following read request. Furthermore, the next data can be pre-fetched during read queue idle time and stored in a cache buffer, in anticipation of another incoming next read request, responsive to which the next data can be returned to the host from the buffer rather than from a read of non-volatile memory.

16 Claims, 13 Drawing Sheets

(56) References Cited

U.S. PATENT DOCUMENTS

| | | |
|---|---|---|
| 2015/0052303 A1 | 2/2015 | Avudaiyappan et al. |
| 2015/0339237 A1* | 11/2015 | Heddes .............. G06F 12/0862 |
| | | 711/137 |
| 2018/0067860 A1* | 3/2018 | Traut ................. G06F 12/0862 |

* cited by examiner

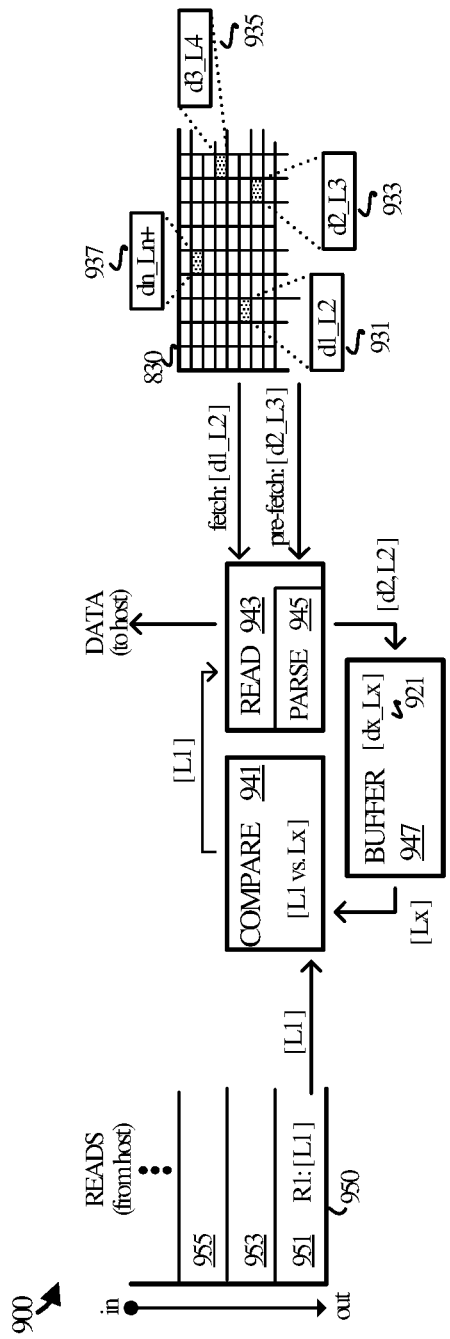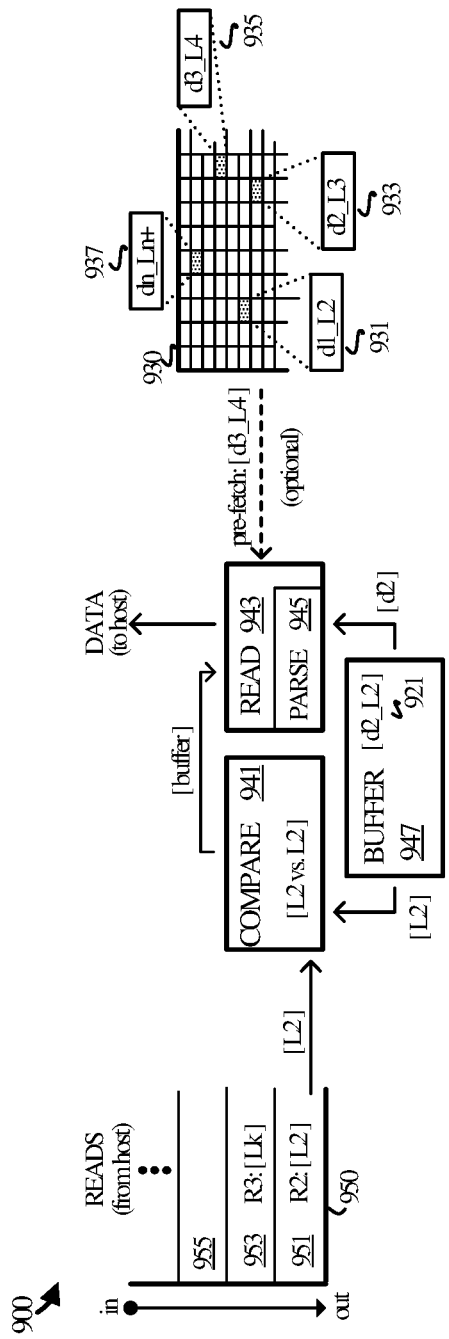

ENHANCED READ-AHEAD CAPABILITY FOR STORAGE DEVICES

CROSS-REFERENCE TO RELATED APPLICATIONS

This application is a continuation-in-part of and claims the benefit of priority to U.S. patent application Ser. No. 16/012,311, filed Jun. 19, 2018, the entire content of all of which is incorporated by reference for all purposes as if fully set forth herein.

TECHNICAL FIELD

Aspects of the disclosure are related to the field of storage devices and, more particularly, to an enhanced read-ahead capability to improve the speed of read operations.

BACKGROUND

As central processing units, graphics processors, and other processing elements have increased in speed, storage devices have become a bottleneck in the overall performance of computing systems. The speed at which solid state drives (SSDs) operate relative to hard disk drives (HDDs) has mitigated this problem somewhat. Regardless, a given SSD can still be a drag on a host and the performance of SSDs can vary greatly from one to another.

The relative performance of a storage device may be evaluated based on a number of factors, such as the capacity of a given device and its read and write speeds. While most write speeds have increased over time, read time has been a critical limiting factor in the performance of storage devices. Sequential read techniques have increased speeds to a certain extent, as have increased toggle rates—but at the expense of increased power consumption.

Random reads present a particular challenge to the goal of increased speed. In contrast with sequential reads, which allow large contiguous blocks of data to be read from adjacent locations on media, random reads seek data scattered across various non-adjacent locations on the media. Random reads thus introduce latency to the read process, which affects the overall performance of a storage device its associated host.

BRIEF SUMMARY

A read-ahead technique is disclosed herein to increase the speed at which storage devices read data. Data for a given write operation may be written to storage such that the location of the next write is stored with the data. Later on, when the data is being read from storage, other data may be pre-fetched from the location of the next write that was written with the data. If the next location is the target of a subsequent read operation, the other data may be returned to the host immediately since it will have already been read from the location where it was stored. This process thereby speeds-up the subsequent read operation.

In the context of data storage, an approach to pre-fetching data prior to a read request involves receiving a read request and a next read request, and updating metadata corresponding to the read request with a next data storage address corresponding to the next read request. Responsive to again receiving the read request at a later time, the next data storage address can be read from the read request metadata and the next data can be pre-fetched from the next data storage address in advance of processing a following read request. Furthermore, the next data can be pre-fetched during read queue idle time and stored in a cache buffer, in anticipation of another incoming next read request, responsive to which the next data can be returned to the host from the buffer rather than from a read of non-volatile memory.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 9A-9B illustrate an operational architecture in an implementation.

DETAILED DESCRIPTION

Figure 1:
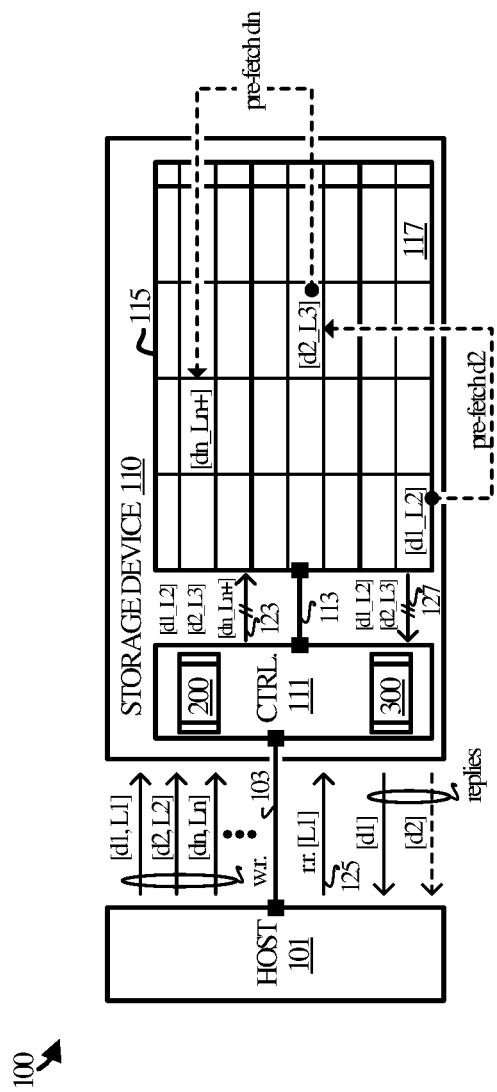
FIG. 1 illustrates a computing system in an implementation.

An improved storage device is disclosed herein having enhanced read-ahead capabilities. In various implementations, read times are decreased (and speed increased) by predicting which address will be read next after a given read operation. The data at that address may be pre-fetched ahead of a subsequent read request targeting that address.

The predicted address may be derived from information saved about write commands as they appear in the queue. Such address tracking may be used during the read of each address as a predictor to the next read command. In an example, the predicted address is obtained from the payload of the preceding read operation. That is, during an earlier write operation, the address of the next write may be written to storage with the data in the payload of a given write. Later, when that payload is the subject of a read request, its payload may be parsed to obtain the address of what was the next write address. The next write address may then be utilized as the next/predicted read address.

As such, the data at the predicted address may be pre-fetched ahead of any subsequent reads that could potentially be directed to the same address. The data may be buffered in anticipation of a relevant read. If the next read request is directed to the predicted address, then the buffered data may be returned immediately, without having to wait on a read operation. If the next read is not directed to the predicted address, the data may be discarded.

Obtaining the address of the next write command is possible because the probability of having other write commands in the queue while performing a given write is high due to the amount of time it takes to program data on media. Conversely, the probability of having other read requests in the queue is low due to the relative speed of reads versus writes. Predicting this next read is therefore useful since it is likely during a read that the read queue is empty.

In some implementations, power consumption may increase as a result of the enhanced read-ahead, since not all the predictions will be successful. A countermeasure to reduce redundant overhead and extra-power consumption is to track the success rate of the proposed predictions described above. Predictive read may be conditionally enabled when the success rate is above a certain threshold and disabled when it falls below the threshold.

In various implementations, the storage device may be, for example, a solid-state drive (SSD), a hard disk drive (HDD), a hybrid SSD-HDD, or any other type of storage device. The device includes a controller that oversees how data is written-to and read-from media, such as NAND-based flash memory, dynamic random-access memory (DRAM), magnetic data storage, optical data storage, and/or any other type of storage technology.

The controller may be implemented in hardware, firmware, software, or a combination thereof, and bridges the memory components of the device to a host. In a hardware implementation, the controller includes control circuitry coupled to a storage medium. The control circuitry includes a receive circuit that receives write requests from a host. Each write request includes data that is the subject of the write request, as well as a target address for the data. The target address may be a logical block address (LBA), physical block address (PBA), or other such identifier that describes where to store the data.

The control circuity also includes a location circuit that identifies a next write address for a next write request after the earlier write request. A write circuit in the control circuitry writes the data for the write request and an indication of the next write address to the target address for the write request. In other words, the data that is the subject of the write request is written to storage with the address of the next write request. As used herein an "indication" refers to any data value, bit, value, signal, flag, condition, offset, code, or number that identifies or may be used to ascertain the location of the set of data that will be subsequently stored on the media.

In a brief example, 4 bytes of a 16 kb page being written may be used for the address of the next write (0.025% overhead). The address of the next write may be written in the header section of a given page, although it is also possible to store the address in the user-data section of the page. Examples of the address include PBAs, LBAs, or both, as well as any other information representative of the location of the next write. In some implementations, the next write address is the absolute address of the location where the next data is stored, including die, page, and block information. In other implementations, the indication of the next write address may be an offset from the current LBA or PBA that may be used to resolve the next address. In still other examples, the next address may be written in a short-hand version of an address. The address of the next write may be stored in an encoded form, an unencoded form, or in any other manner.

Subsequent to the write requests, the host may communicate a read request that targets the same address as in the initial write request. A read circuit in the control circuitry reads the data and the next write address from the target address. In addition, the read circuit reads-ahead at a location indicated by the next write address to obtain next data in advance of a next read request. As mentioned above, the next write address—which serves as the read-ahead address—may be indicated by an LBA, a PBA, an offset, a flag, or the like. For example, in the case of an LBA, the control circuitry translates the LBA to a PBA in order to fetch the next data. In another example, no translation is needed if the next write address was stored as a PBA. In the case of an offset, signal, flag, or the like, the control circuitry may calculate the read-ahead PBA from the present PBA and the value associated with an offset, signal, flag or the like. Once the next read request is communicated by the host, the next data is ready to be returned to the host immediately. In some cases, both the initial read request and the next read request are considered random read requests, and the read operations are therefore considered random reads. In some implementations, the control circuitry further comprises a buffer circuit to store an indication of the next write address and to store the next data. The indication of the next write address as-buffered may be stored as a value that can be compared to the target address in a relation to subsequent read request. For example, the buffered value may be an LBA, which can be compared against an LBA in a subsequent read request. In certain embodiments, if subsequent read requests utilize PBAs, then the buffered value may be PBA instead of an LBA. In some scenarios, addresses and data associated with multiple read-ahead operations may be stored in the buffer simultaneously. The buffer may be sized such that it can accommodate one or more pages of data. In one scenario, the buffer may be 96 kB or less of RAM, or the size of approximately four pages of data. However, it may be appreciated that the RAM size could increase, as could the page size.

A comparator portion of the control circuitry may then determine that the next target address specified in the next read request matches the next write address. This may be accomplished by comparing the value of the next write address in the buffer with the value of the address in the next read request. For instance, an LBA in the next read request may be compared against an LBA in the buffer. In another example, a PBA in the next read request may be compared against the PBA in the buffer. In some alternative embodiments, the value stored in the buffer may differ by an offset from the actual value of the next write address as stored on media or calculated during a read-ahead operation. In such a situation, the control circuitry would calculate the actual value before comparing it to the value in the next read request. The comparator or other element(s) of the control circuitry may responsively return the next data to the host in reply to the next read request in a situation where the values match each other. The comparator may discard the next data if the next target address given in the next read request does not match the next write address.

The controller may include a write queue and a read queue in some implementations. The read queue receives read requests from a host, while the write queue receives write requests. The read requests may indicate where in non-volatile storage media to read data, thereby allowing the controller to fetch the data from the location indicated by a given read request.

Having done so, the controller parses a predicted address of a next read request from the payload read from the location. The controller may then pre-fetch additional data from the predicted location of the next read request, ahead of actually receiving the next read request. If the actual location of the next read request differs from the predicted location, the controller may simply discard the next data and proceed to read from the actual location.

With respect to the write queue, each of the write requests in the queue indicate where to write the data for a given write request. A predictor portion of the controller identifies the predicted location for the next read request based on the location indicated by a next write request after an earlier write request. A write portion of the controller may write, to the location indicated for the earlier write request, the data for the earlier write request and an indication of the predicted location. A buffer portion of the controller may store the indication of the predicted location for the next read request and also the next data.

As mentioned above, a comparator portion may determine that the location indicated by the next read request matches the predicted location for the next read request. The comparator or other portion(s) of the controller may return the next data to the host. The next data may be discarded if the location indicated by the next read request does not match the predicted location for the next read request.

Such enhanced read-ahead technology provides various technical advantages, as may be evident from the discussion above and the following discussion of FIGS. 1-10. For example, pre-fetching data ahead of read request increases read speeds. This may be especially beneficial in the case of random reads, which take a longer amount of time to complete because their data are scattered about on the media. In another example, the requesting application on the host need not be known to the controller. Rather, the controller may employ enhanced ahead with no knowledge of the requesting application.

Turning now to the drawings, FIG. 1 illustrates computing system 100 in an implementation of enhanced read-ahead technology. Computing system 100 includes host 101 and storage device 110. Host 101 is representative of any host sub-system that may write data to and read data from storage device 110. Storage device 110 is representative of any device capable of connecting to host 101 internally or externally for the purposes of reading and writing data. Examples of storage device 110 include, but are not limited to, solid-state drives (SSDs), thumb drives, hard disk drives (HDDs), hybrid SSD/HDD drives, and any variation or combination thereof. Examples of computing system 100 include, but are not limited to, personal computers, laptop computers, server computers, tablet computers, mobile phones, network drives, consumer electronics devices (e.g. cameras, televisions, and media players), gaming devices, durable goods devices, and any other system, variation, or combination thereof that utilize one or more storage devices.

Host 101 communicates with storage device 110 over connection 103. Connection 103 is representative of the one or more physical interconnects that couple host 101 and storage device 110 and over which storage communications may flow between the two. Host 101 may utilize one or more interface protocols when communicating with storage device 110, such as (but not limited to) Serial ATA (SATA), Fibre Channel, Firewire, Serial Attached Small Computer Systems Interface (SAS), Advanced Technology Attachment/Integrated Drive Electronics (ATA/IDE), Universal Serial Bus (USB), and Peripheral Component Interconnect Express (PCIe).

Storage device 110 includes controller 111 and storage media 115. Controller 111 is representative of one or more processing elements that perform a supervisory role over writing data to storage media 115 and reading data from storage media 115. Controller 111 is capable of executing write process 200 and read process 300, described in more detail in FIG. 2 and FIG. 3 respectively, which may be implemented in hardware, but also in firmware, software, or other forms of program instructions executable by controller 111. Storage media 115 is any non-volatile medium on which data may be written and read. Examples include, but are not limited to, NAND flash media, DRAM media, phase change media, magnetic media, and optical media. Connection 113 is representative of the one or more physical interconnects that couple controller 111 and storage media 115.

In operation, host 101 communicates read and write requests to controller 111 to be carried out on storage media 115, of which write requests 121 and read request 125 are representative. Controller 111 executes write process 200 when handling write requests 121 and executes read process 300 when handling read request 125. The following is a detailed discussion of write process 200 and read process 300 and refers parenthetically to the steps in FIG. 2 and FIG. 3 respectively.

Figure 2:
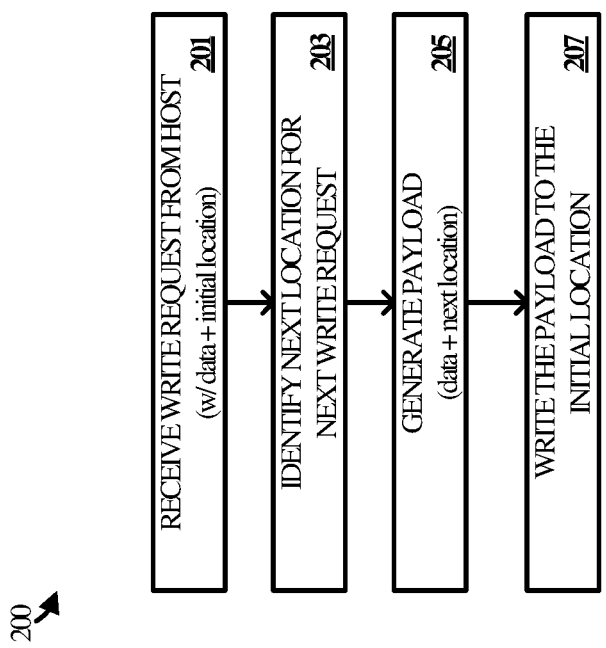
FIG. 2 illustrates a write process in an implementation.

Referring to FIG. 2, controller 111 receives a given write request from host 101 (step 201). The write request includes that data to be written and a location indicative of where to write the data on storage media 115. The location may be given by a physical block address (PBA), a logical block address (LBA), or any other suitable indication. In some cases, the location may not be given in the write request itself, but rather may be provided by host 101 separately or determined by controller 111 upon receiving the write request.

Next, controller 111 identifies the next location of the next write request submitted by host 101 (step 203). This may be accomplished by, for example, reading the address associated with the next write request in the write queue. Controller 111 then generates a payload to be written to the location specified for the initial write request (step 205). The payload may include at least the data for the first write request and the next location for the next write request. The next location may be a PBA, but alternatively could be an LBA.

While only a single next location is included in the payload in this example, it should be appreciated that multiple locations could be stored in a single payload. For example, the next address and the next address after that could both be stored in a given payload. In addition, while the term "next" as used herein refers to the very next address in the queue, variations are possible. For example, the very next address could be skipped and the next after that used instead and included in the payload.

Having generated the payload, controller 111 writes the payload to the initial location specified for the write request (step 207). In this manner, the data for the write request is stored with the identity of the location for the next write request in the queue. Write process 200 may continue for subsequent write requests, writing the address of the next write request to follow each preceding request with the data for the request. The subsequent location information may serve as a predicted location for read process 300, a discussion of which follows below.

Figure 3:
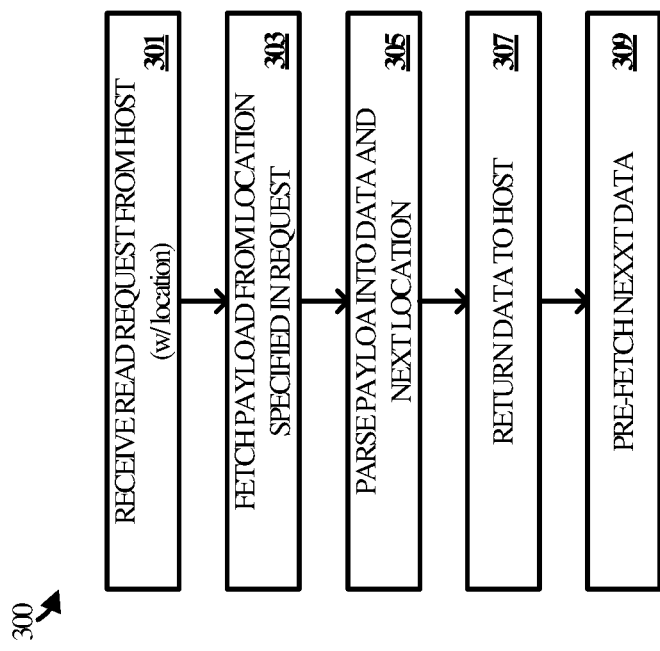
FIG. 3 illustrates a read process in an implementation.

Referring to read process 300 in FIG. 3, controller 111 receives a given read request from host 101 (step 301). The read request includes an address at which controller 111 is to read data. The location may be specified as a PBA or an LBA, in which case controller 111 would translate the LBA into a PBA.

Controller 111 fetches the payload from storage media 115 at the address given by the read request (step 303) and parses the payload into its data and the next location that was stored with the data in the context of write process 200 (step 305). The data may be returned to host 101 (step 306), while the next location is used to pre-fetch next data (step 307).

It may be appreciated that the pre-fetch step need not always occur. Rather, controller 111 may refrain from attempting to pre-fetch data if the payload contains a null value or otherwise does not include a next location. In another optional example, controller 111 may refrain from the parsing and prefetching steps if the read request is not a random read request. That is, before proceeding to step 305 and step 307, controller 111 may first determine whether the read request is a random read request. Controller 111 may ascertain itself that a read request is a random read or may be made aware of the fact by host 101.

The address of the next location and the data that is pre-fetched may be buffered such that they are available when a subsequent read request is received. In some implementations, the payload may include more than one next address, in which case the controller may pre-fetch and buffer data from multiple locations. Multiple "next addresses" would also then be buffered.

Controller 111 may compare the address in the subsequent read request to the next address in the buffer to determine if they are the same (or to multiple next addresses if present in the buffer). If so, controller 111 may return the pre-fetched data to host 101 in reply to the subsequent read request, rather than having to fetch it.

Referring back to the example scenario illustrated in FIG. 1, host 101 submits write requests 121 to storage device 110. Write requests 121 include a first request having data d1 and an address L1; the second request includes data d2 and location L2; and the n$^{th}$ request includes data dn and location Ln.

Applying write process 200 to the first write request, controller 111 generates payloads 123 to be written to storage media 115. Controller 111 generates a payload d1_L2 from the data in the first request and the address in the second request. The payload is written to storage media 115. Likewise, controller 111 generates a payload d2_L3 for the second request. The payload generated for the n$^{th}$ request includes the data from the n$^{th}$ request and the location of the next write request in the queue, or dn_Ln+.

Host 101 also submits read request, of which read request 125 is representative. Read request 125 identifies location L1 as may be representative of, for example, a random read request, although other types of reads are possible.

Applying read process 300, controller 111 fetches (and pre-fetches) payloads 127 in response to read requests from host 101. For example, controller 111 fetches the payload from location L1, which is the payload for the first write request discussed above, or d1_L2.

Controller 111 parses the payload to obtain the next location, L2. The data portion of the payload (d1) may be returned to host 101. Controller 111 also pre-fetches the payload at location L2, in anticipation of another read request directed to L2. That payload is also parsed into its data portion (d2) and location portion (L3).

Assuming that another read request is received that is directed to L2, controller 111 may immediately return a response with data d2, without having to fetch the data. However, data d2 may be discarded or overwritten after a period of time if no read requests are received that are directed to L2. Controller may optionally pre-fetch the payload at location L3, and then again at location Ln+, and so on until a constraint of limit is reached.

Figure 4:
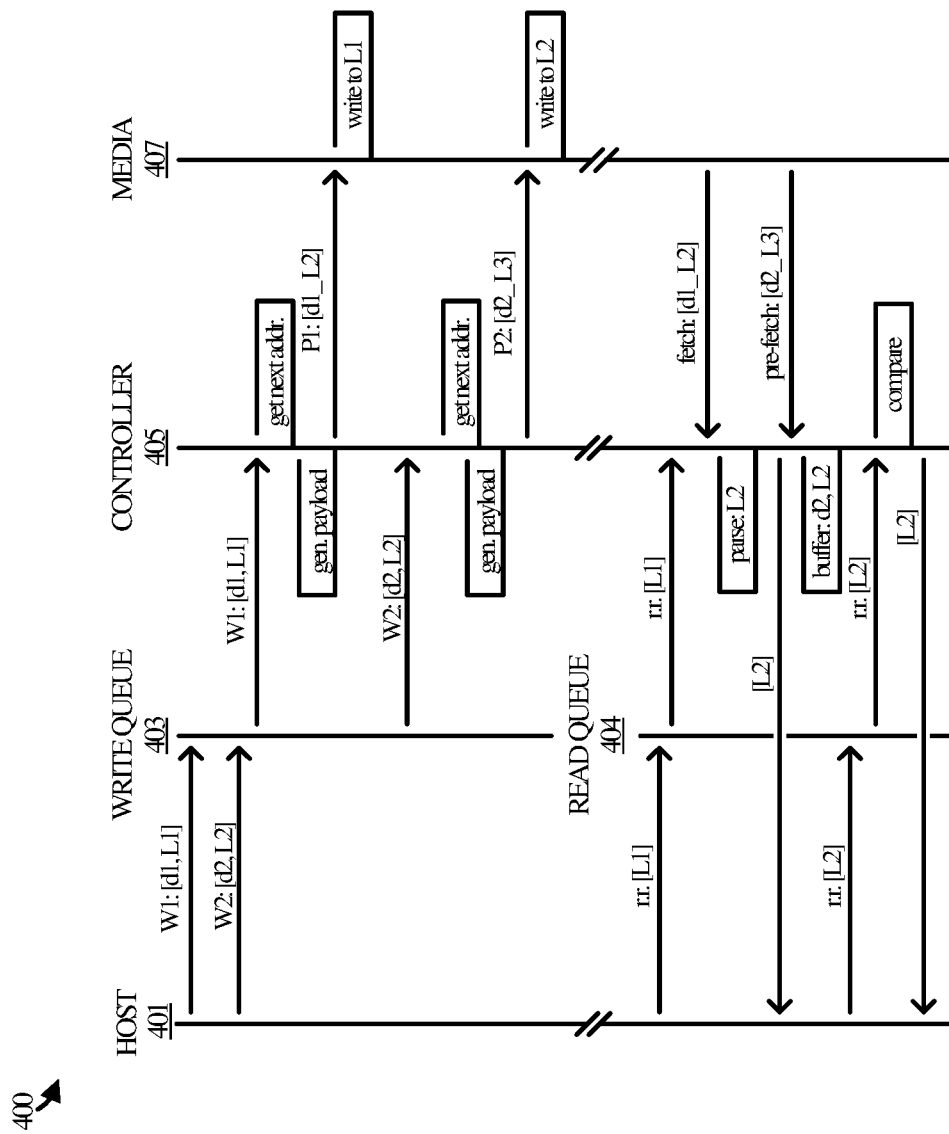
FIG. 4 illustrates an operational scenario in an implementation.

FIG. 4 illustrates an operational scenario 400 in an implementation that demonstrates various timing aspects of the enhanced read-ahead technology disclosed herein. Operational scenario 400 involves host 401, write queue 403, read queue 404, controller 405, and media 407. While shown separately, write queue 404 and read queue 404 may be implemented either externally or internally with respect to controller 405. It may be appreciated that other elements, connections, and the like may be involved but are not shown for purposes of clarity.

In operation, host 401 communicates two write requests to write queue 403, denoted by w1 (d1,L1) and w2 (d2, L2). While shown as a direct communication between host 401 and the queues, it may be appreciated that the requests may be routed through other physical or logical elements before reaching write queue 403, including controller 405.

Controller 405 implements the write requests in the general order in which they are received in the queue. Therefore, controller 405 implements w1 first, followed by w2. With respect to the first write request, controller 405 looks into the queue to identify the address of the next write request—that is, w2. With L2 known, controller 405 generates a payload for w1, which includes d1 and L2. Controller 405 then writes d1 and L2 to media 407 in the location specified by the first write request, L1.

In accordance with the general order of the queue, controller 405 next processes the second write request. It is assumed for exemplary purposes that a third write request is behind w2 in write queue 403 and is addressed to L3. Controller 405 therefore generates a payload for w2 that includes d2 and L3. The payload is then written to L2 in media 407.

Later, after the writes have been completed, host 401 may submit read requests to obtain the data that was previously written for w1. Read queue 404 is populated with the read request, which indicates the address at which to obtain the data. Controller 405 fetches the payload stored at the indicated address, which includes data (d1) and a next location (L2).

Controller 405 parses the payload into its data and location components and returns the data portion to host 401. With the location portion, controller 405 pre-fetches the payload at location L2. The payload includes data (d2) and another "next" location (L3). Controller 405 buffers the data with the location from which it was retrieved (L2), as opposed to the location that was stored with the data. Controller 405 could optionally perform another pre-fetch for the payload stored at L3.

Host 401 communicates a subsequent read request. Controller 405 responsively compares the location in the subsequent read request to the location stored in the buffer. In this example, both addresses reflect L2. As such, controller 405 may reply to the read request with the buffered data, d2, rather than having to fetch the data from media 407.

Figure 5:
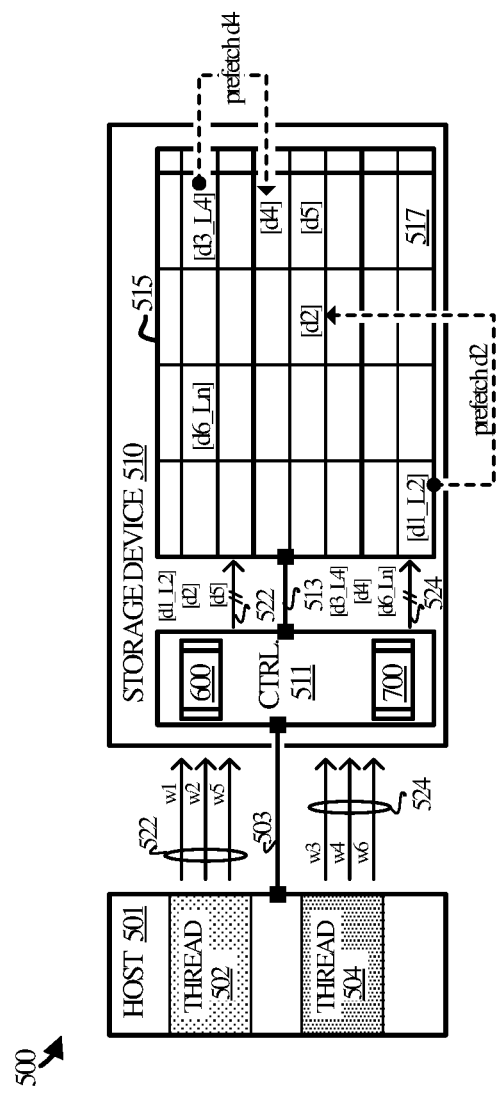
FIG. 5 illustrates a computing system in an implementation.

FIG. 5 illustrates computing system 500 in another implementation of enhanced read-ahead technology as applied in the context of a multi-threaded environment. Computing system 500 includes host 501 and storage device 510. Host 501 is representative of any multi-threaded sub-system that may write data to and read data from storage device 510. Storage device 510 is representative of any device capable of connecting to host 501 internally or externally for the purposes of reading and writing data.

Thread 502 and thread 504 are each representative of the various threads that may be available in a multi-threaded environment. Each thread may be assigned dynamically at run-time to a different application, utility, or component running in host 501. The threads submit read requests to storage device 510, represented by requests 522 (associated with thread 502) and requests 524 (associated with thread 504).

Host 501 communicates with storage device 510 over connection 503. Connection 503 is representative of the one or more physical interconnects that communicatively couple host 501 and storage device 510. Host 501 may utilize one or more interface protocols when communicating with storage device 510, such as (but not limited to) Serial ATA (SATA), Fibre Channel, Firewire, Serial Attached Small Computer Systems Interface (SAS), Advanced Technology Attachment/Integrated Drive Electronics (ATA/IDE), Universal Serial Bus (USB), and Peripheral Component Interconnect Express (PCIe).

Storage device 510 includes controller 511 and media 515. Controller 511 is representative of one or more processing elements that control the read and write processes with respect to media 515. Controller 511 is capable of executing write process 600 and read process 700, described in more detail in FIG. 6 and FIG. 7 respectively. Media 515 is any non-volatile medium on which data may be written and read. Examples include, but are not limited to, NAND flash media, DRAM media, phase change media, magnetic media, and optical media. Connection 513 is representative of the one or more interconnects that couple controller 511 and media 515.

In operation, host 501 communicates read and write requests to controller 511. Controller 511 executes write process 600 when handling write requests and read process 700 when handling read requests. The following is a detailed discussion of write process 600 and read process 600 and refers parenthetically to the steps in FIG. 6 and FIG. 7 respectively.

Figure 6:
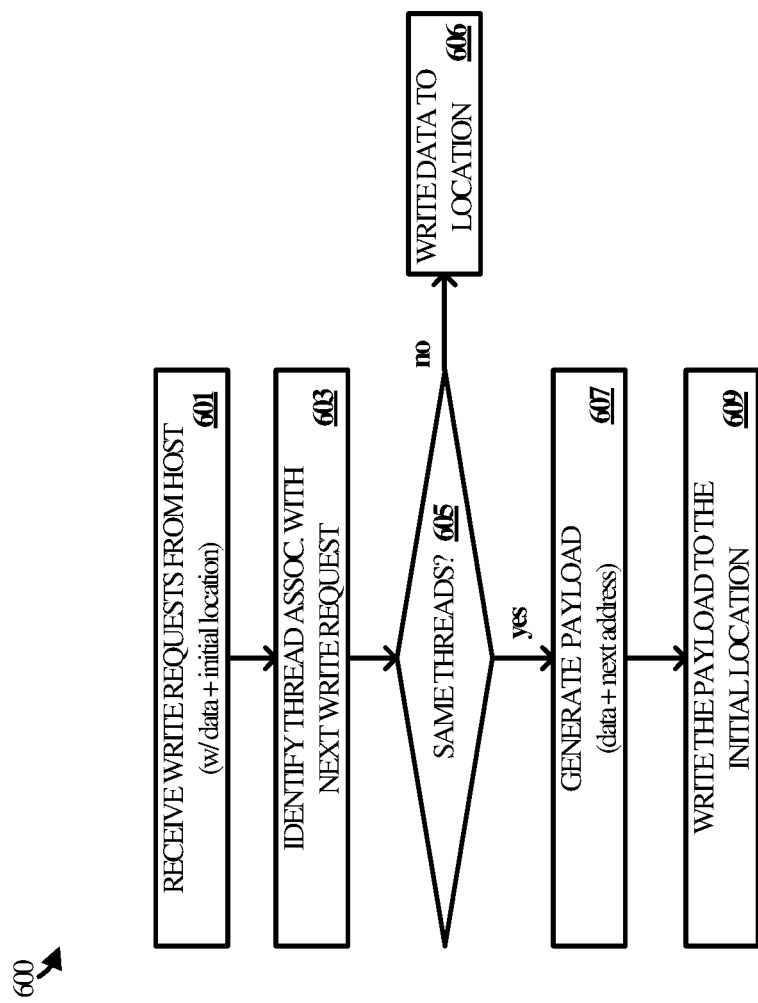
FIG. 6 illustrates a write process in an implementation.

Referring to FIG. 6, controller 511 receives multiple write request2 from host 501 (step 501). Each write request includes the data to be written and a location indicative of where to write the data on media 515. The location may be given by a physical block address (PBA), a logical block address (LBA), or any other suitable address. In some cases, the location may not be given in the write request itself, but rather may be provided by host 501 separately or determined by controller 511 upon receiving the write request.

For any given write request, controller 511 identifies the thread associated with the next request after it (step 603). The thread may be identified in the next write request or may be determined in some other manner. Controller 511 compares the thread associated with the instant request to the thread associated with the next request to determine if they are the same (step 605).

If the threads are the same, then controller 511 generates a payload comprised of the data for the instant request and the next address of the next write request (step 607). The payload is then written to the indicated address (step 609). However, if the threads are not the same, then controller 511 simply writes the data to the indicated address (step 606), thereby conserving resources by avoiding the step of generating a payload.

Figure 7:
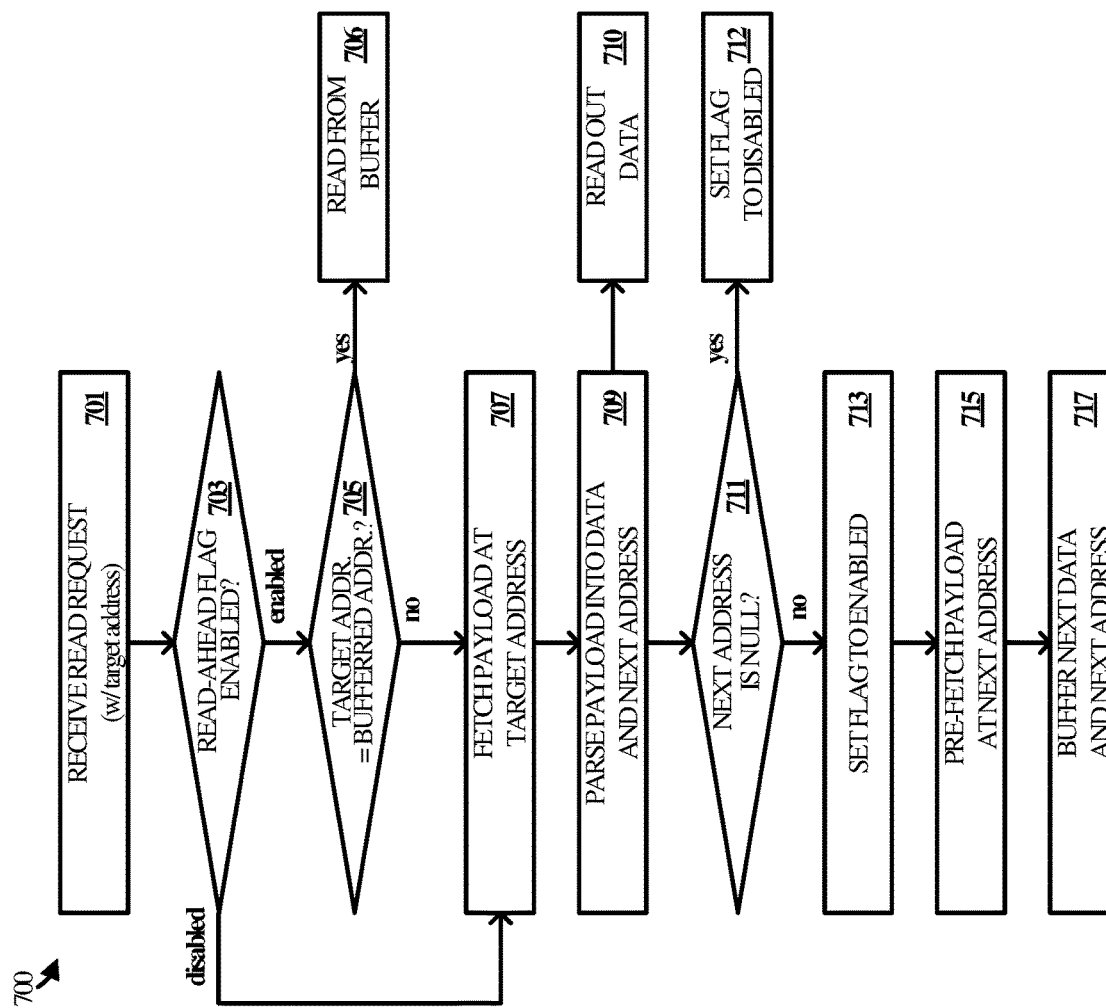
FIG. 7 illustrates a read process in an implementation.

Referring to FIG. 7, controller 511 receives a read request that identifies a target address (step 701). Controller 511 responsively checks a read-ahead flag to determine whether any information had been buffered for a previous read request (step 703). If the flag is enabled, controller 511 evaluates the target address in the request against the address stored in the buffer (step 705). If they are the same, then controller may read data from the buffer that was pre-fetched in the context of handling a previous read request (step 706).

If the addresses are not the same, then controller 511 proceeds to fetch the payload at the specified address in the read request (step 707). Controller 511 parses the payload into its component parts, which include at least data and an address pertaining to the next data to be written after the subject data (step 709).

With the data in-hand, controller 511 may read out the data to host 501 (step 710). Controller 511 also checks if the next address is null or some other value that indicates that a next address was not written to storage (step 711). This may be the case when, for example, the next write request to follow a given write request did not originate from the same thread (see step 605 above with respect to FIG. 6).

If the next address value is null, the controller 511 sets the flag to disabled (step 712) so that, upon receiving a subsequent read request, the step of comparing addresses may be skipped. If the next address is not null, controller 511 sets (or maintains) the flag value to enabled, so that target addresses in a subsequent read request may be compared (step 713).

Having set the flag, controller 511 pre-fetches the payload stored at the location of the next address parsed from the subject payload (step 715). Controller 511 stores the next data from the pre-fetched payload in a buffer (step 717), along with the address corresponding to the next data. That next address may be compared to a subsequent target address included in a subsequent read request when read process 700 returns to step 705.

Figure 8:
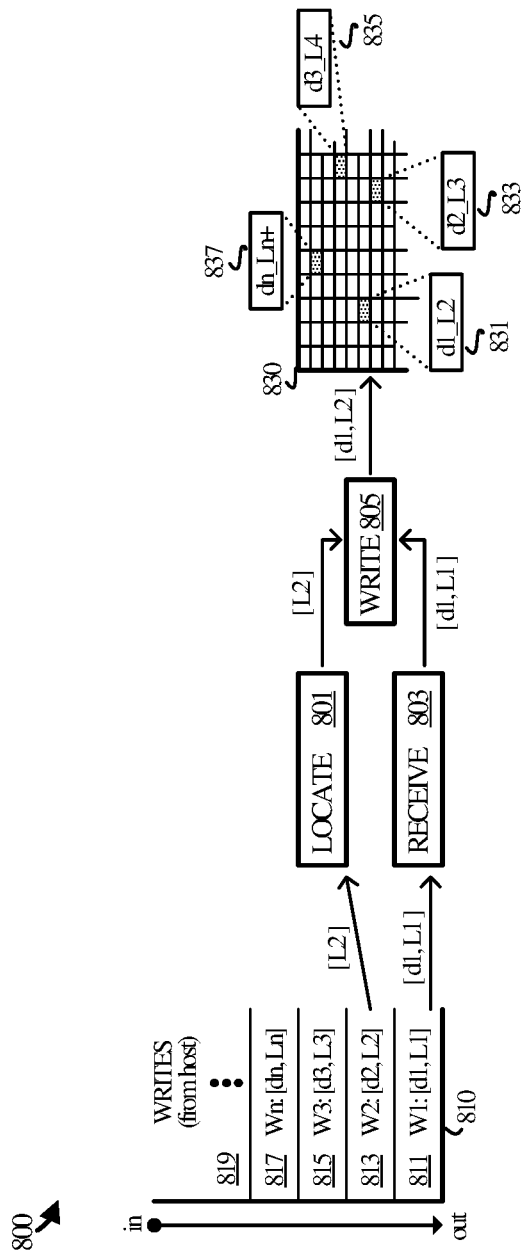
FIG. 8 illustrates an operational architecture in an implementation.

FIG. 8 illustrates an operational architecture 800 in an implementation of the write-side of enhanced read-ahead technology and an associated example scenario. In relation to FIG. 8, FIG. 9A and FIG. 9B illustrate an operational architecture 900 in an implementation of the read-side of said enhanced read-head technology, as well as an associated example scenario. It may be appreciated that the two architectures could be combined (without any redundant elements) in the context of a suitable storage device, such as an SSD, hybrid HDD/SSD, or the like.

Referring to FIG. 8, operational architecture 800 includes a write queue 810, media 810, and various operational modules represented by locate module 801, receive module 803, and write module 805. Locate module 801, receive module 803, and write module may be implemented in hardware, firmware, or other software, as well as any variation or combination thereof. Write queue 810 may be implemented externally from media 830 but could also be implemented internally. In either case, write queue 810 is accessible to one or more of locate module 801, receive module 803 and write module 805. It may be appreciated that operational architecture 800 may include other elements that are omitted for the sake of clarity, such as a system bus, interfaces and interconnections, and the like.

In operation write requests are received into write queue 810 from a host (not shown) and occupy an order or place in the queue. The write requests are represented by request w1 in place 811; request w2 in place 813; request w3 in place 815, and request n in place 817. Accordingly, the write requests are handled in that order: w1, w2, w3, wn, and so on.

Receive module 803 receives the write requests as they are dispatched from write queue 810 to be executed. As an example, receive module 803 receives request w1 and passes it to write module 805. Request w1 includes data (d1) and a location identifier (L1) of where to write the data.

Locate module 801 looks into write queue 810 to identify the location of the next write request in the queue after the subject write request, which in this case is w2. The location of w2 is L2, and so location module 801 passes L2 to write module 805. Write module 805 receives both the information from receive module 803 and the information from locate module and generates a payload to be written to L1. In this example, the payload 831 is a combination of d1 and L2.

Similar operations are carried out with respect to the other write requests in the queue. Payload 833 is generated in association with w2 and includes data d2 and location L3. Payload 835 is generated in association with w3 and includes data d3 and location L4. Finally, payload 837 is generated in association with wn and includes data do and location Ln+. In this manner, the payloads may be examined during the read process and pre-fetched if appropriate, thereby speeding up the read process.

Referring to FIG. 9A, operational architecture 900 includes a read queue 950, media 910, and various operational modules represented by compare module 941, read module 943, and buffer 947. Read module 943 may include parse module 945, although it may be implemented externally with respect to read module 943. Compare module 941, read module 943, buffer 947, and parse module 945 may be implemented in hardware, firmware, or other software, as well as any variation or combination thereof. Read queue 910 may be implemented externally from media 930 but could also be implemented internally. In either case, read queue 910 is accessible to one or more of compare module 941, read module 943, and buffer 947. It may be appreciated that operational architecture 900 may include other elements that are omitted for the sake of clarity, such as a system bus, interfaces and interconnections, and the like.

In operation, read requests are received into read queue 950 from a host. The read request are represented by r1 in FIG. 9A, and r2 and r3 in FIG. 9B. The requests have an order or place in the queue, represented by place 951, place 953, and place 955 respectively. The read requests are assumed for the sake of illustration to be random read requests, as opposed to sequential read requests, although sequential read requests could be interspersed among the random read requests.

The read requests are taken of the queue and communicated to compare module 941. Compare module 941 compares the address in a given read request to an address that is buffered in buffer 947 (if any) to determine if the subject data needs to be fetched or has already been pre-fetched. In this example, read request r1 relates to location L1. L1 is compared to Lx in buffer 947. Since they do no match, compare module 941 passes the address to read module 943.

Read module 943 responsible fetches payload 931 from location L1. Parse module 945 parses the payload into its component parts, d1 and L2. Read module 943 is able to return d1 to the host and pre-fetches payload 933 from L2. Payload 933 includes data d2 and location L3. Data d2 is communicated to buffer 947 to be stored in association with location L2.

FIG. 9B illustrates a continuation of the example scenario begun in FIG. 9A. In FIG. 9B, read request r2 is received and taken off the queue by compare module 941. Here, compare module 941 determines that the target address in r2 is the same as the stored address in buffer 947. Accordingly, compare module 941 instructs read module 943 to read out data d2 from buffer 942 to the host. Read module 943 could be omitted in this step.

Since the payload at location L2 referenced a next address of L3, read module could optionally pre-fetch payload 935 at L3. In so doing, parse module would parse payload 935 to obtain data d3. Data d3 and location L3 would be stored in buffer 947 to be compared against one or more subsequent read requests.

Figure 10:
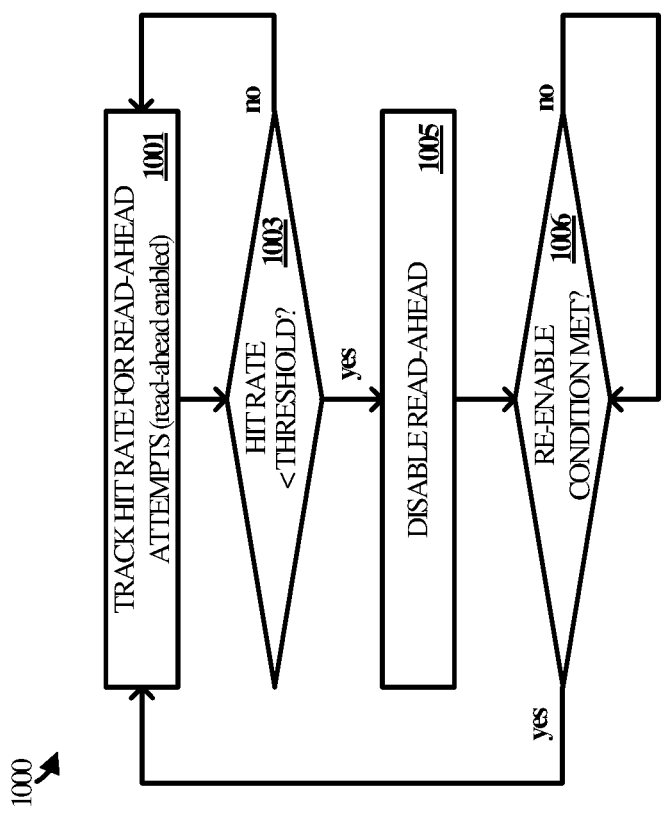
FIG. 10 illustrates a power control process in an implementation.

FIG. 10 illustrates a power control process 1000 in an implementation whereby the enhanced read-ahead technology disclosed here is dynamically enabled and disabled based on various operating conditions. A controller in a solid-state drive or other suitable storage device may employ power control process 1000, which may be implemented in hardware, firmware, or other software.

In operation, a given controller tracks the hit rate for read-ahead attempts that are made in the context of an enhanced read process (step 1001). The hit rate may pertain to the rate at which data that is pre-fetched is actually requested by a subsequent read request. For instance, an initial read request directed to a first location may result in a payload that identifies a second location. The data at the second location would then be pre-fetched ahead of any subsequent read request that may (or may not) target the second location. If the next read request is directed to the second location, then the pre-fetch would be considered a hit, whereas if the next read request is directed to a different location, the pre-fetch would be considered a miss.

The controller may track the success rate of the pre-fetch operations by counting how many times pre-fetched data becomes the subject of a subsequent read request. The controller may also analyze whether or not the hit rate falls below a given threshold (step 1003).

If the hit rate remains at or above the threshold, then the controller may continue to operate with the read-ahead process enabled. If the hit rate falls below the threshold, the controller disables the read-ahead process (step 1005).

To re-enable the read-ahead process, the controller periodically evaluates one or more other conditions (step 1006). For example, the read-ahead may be disabled for a period of time, at the expiration of which it is automatically re-enabled. In another example, the read-ahead may remain disabled until a battery level or other power condition is met. Until then, the controller operates with the read-ahead process disabled.

Disabling the read-ahead process may conserve power, processing cycles, or other resources in the face of a high rate of missed read-ahead attempts. Re-enabling the process upon a change in conditions allows the device to regain the advantages of enhanced read-ahead.

Physical Description of an Illustrative Operating Context: Data Storage System

There is a commercial demand for high-capacity digital data storage systems, in which multiple data storage devices (DSDs), such as solid-state drives (SSDs) and/or hard disk drives (HDDs) and/or hybrid SSD-HDD drives or any other type of storage device or variation or combination thereof, capable of connecting to a host 1150 for the purposes of reading and writing data, may be housed in a common enclosure. Data storage systems often include large enclosures that house multiple shelves on which rows of DSDs are mounted.

Recall that random read performance is a performance-limiting factor of a data storage device and can introduce latency into the read process, thereby affecting the overall performance of a device. Therefore, any means of predicting which address is going to be read next could save time, which could lead to a reduction to the overall device latency. Hence, a way to predict which data will be requested from the controller next, and initiating a "read ahead" (or "pre-fetch") could increase random read performance and reduce device latency.

Figure 11:
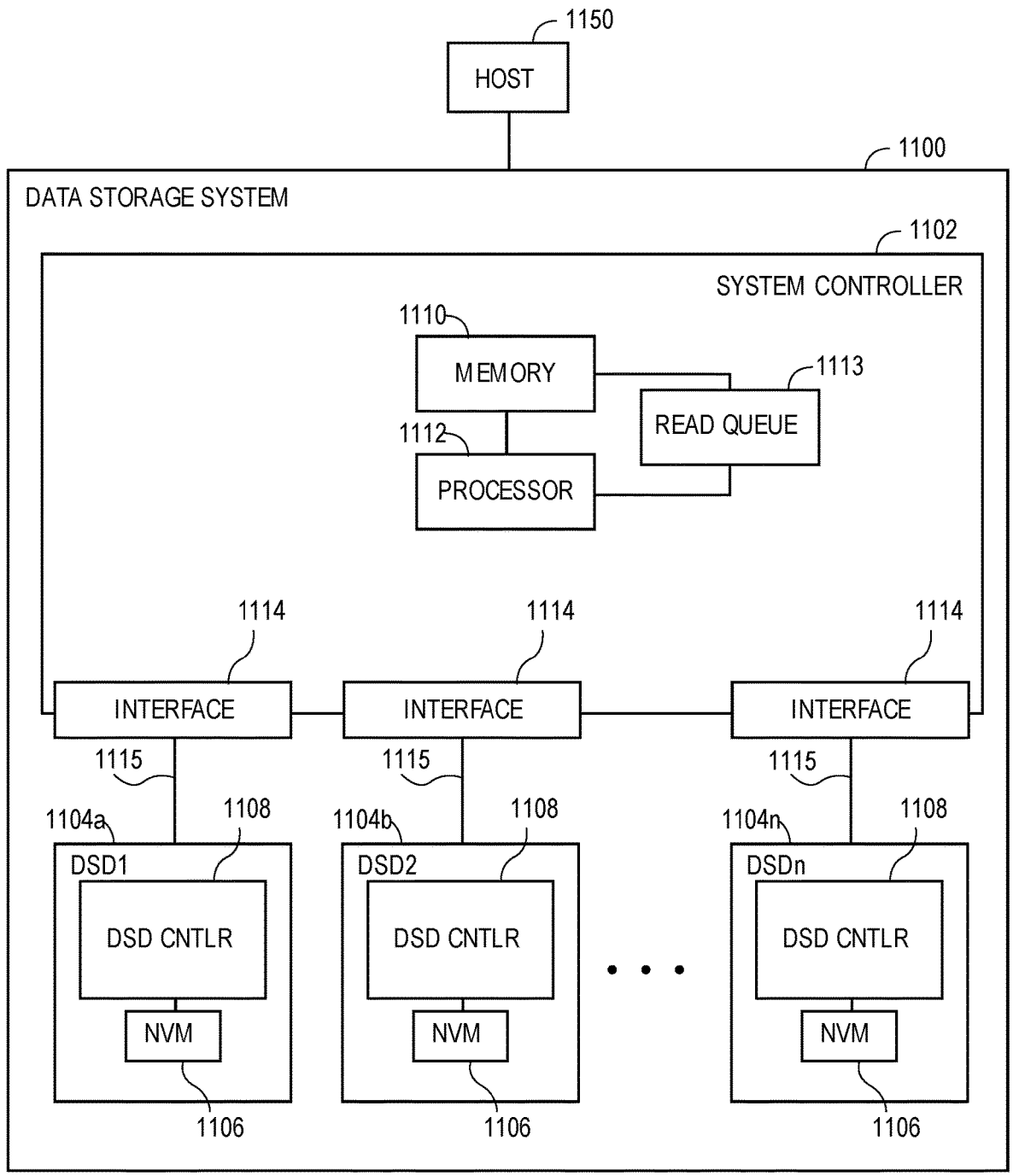
FIG. 11 illustrates a simplified computing system architecture in an implementation.

FIG. 11 is a block diagram illustrating a simplified computing system architecture, according to an embodiment. The example computing system architecture includes a data storage system 1100 that comprises multiple data storage devices (DSDs) 1104a (DSD1), 1104b (DSD2), and 1104n (DSDn) (collectively, 1104a-1104n), where n represents an arbitrary number of DSDs which may vary from implementation to implementation. Each DSD 1104a-1104n is communicative with and under some level of supervisory control of a system controller 1102, via a respective communication interface 1114 according to a corresponding communication or interface protocol 1115. Each DSD 1104a-1104n includes corresponding non-volatile memory (NVM) 1106 (e.g., typically in the form of NAND flash memory in the case of SSDs and spinning magnetic disk media in the case of HDDs) controlled by a respective DSD memory controller 1108 that oversees how data is written to and read from the corresponding NVM 1106.

The system controller 1102 of data storage system 1100 includes at least a memory 1110, a processor 1112, and a read queue 1113. The read queue 1113 receives and/or is populated by read requests from the host 1150, where the read requests may indicate a location in the NVM 1106 from which to obtain or read the requested data (e.g., by way of a logical block address, or "LBA", or a physical block address, or "PBA"), thereby allowing the corresponding DSD controller 1108 to fetch the data from the appropriate NVM 1106 memory location indicated by a given read request. While depicted internally and separately, the read queue 1113 may be implemented either externally or internally with respect to system controller 1102, or may be implemented within the memory 1110. It may be appreciated that other elements, connections, and the like may be involved with system controller 1102 but are not shown here for purposes of clarity.

Processing, functions, procedures, actions, method steps, and the like, that are described herein as being performed or performable by system controller 1102, or by a DSD memory controller 1108, may include enactment by execution of one or more sequences of instructions stored in one or more memory units and which, when executed by one or more processors, cause such performance. System controller 1102 and the DSD controllers 1108 may be embodied in any form of and/or combination of software, hardware, and firmware. For example, the system controller 1102 may comprise an application-specific integrated circuit (ASIC) comprising at least one memory unit (e.g., memory 1110) for storing such instructions (such as firmware, for a non-limiting example) and at least one processor (e.g., processor 1112) for executing such instructions, enabling read-ahead capabilities as described elsewhere herein.

The data storage system 1100 may be communicatively coupled with a host 1150, which may be embodied in a hardware machine on which executable code executes (for non-limiting examples, a computer or hardware server, and the like), or as software instructions executable by one or more processors (for non-limiting examples, a software server such as a storage server, file server, database server, application server, media server, and the like). Host 1150 generally represents a client of the data storage system 1100, and has the capability to make read and write requests (input/output or "IO") to the data storage system 1100. Note that the system controller 1102 may also be referred to as a "host" because the term is often generally used in reference to any device that makes TO calls to a data storage device or an array of devices, such as DSDs 1104a-1104n. Host 1150 may utilize one or more interface protocols when communicating with data storage system 1100, such as but not limited to Serial ATA (SATA), Fibre Channel, Firewire, Serial Attached Small Computer Systems Interface (SAS), Advanced Technology Attachment/Integrated Drive Electronics (ATA/IDE), Universal Serial Bus (USB), Peripheral Component Interconnect Express (PCIe), and the like.

Read Prediction Using Metadata Hints Based on Previous Read Operations

According to analysis, random read logs manifest significant amounts of repetitive patterns. According to an embodiment, one approach to "read-ahead" involves saving the next read command address at the metadata of current read address. This metadata update may be performed, according to an embodiment, via a conventional "Read-Modify-Write" operation, which provides for both reading a memory location and writing a new value into it simultaneously, as an atomic operation. This approach to read-ahead may generally involve, for each read command that arrives, updating the metadata of the previous read command with an indication (e.g., a "hint") to a location (and size) of the current read command. This information can then be used in the future, i.e., when receiving the same read command, for executing a pre-fetch of future random read commands. Therefore, the Quality of Service (QoS) parameter can be significantly improved. That is, in the context of command execution latency (e.g., from command arrival through completion posting), if the read-ahead prediction hit rate is high, then the latency of the command execution is reduced due to reading from the media ahead of time. Thus, QoS, such as in the form of command execution latency, is an especially noteworthy parameter in low-queue-depth scenarios, for example, in which the host sends only a few outstanding commands to the device at a time (e.g., up to 8).

Figure 12:
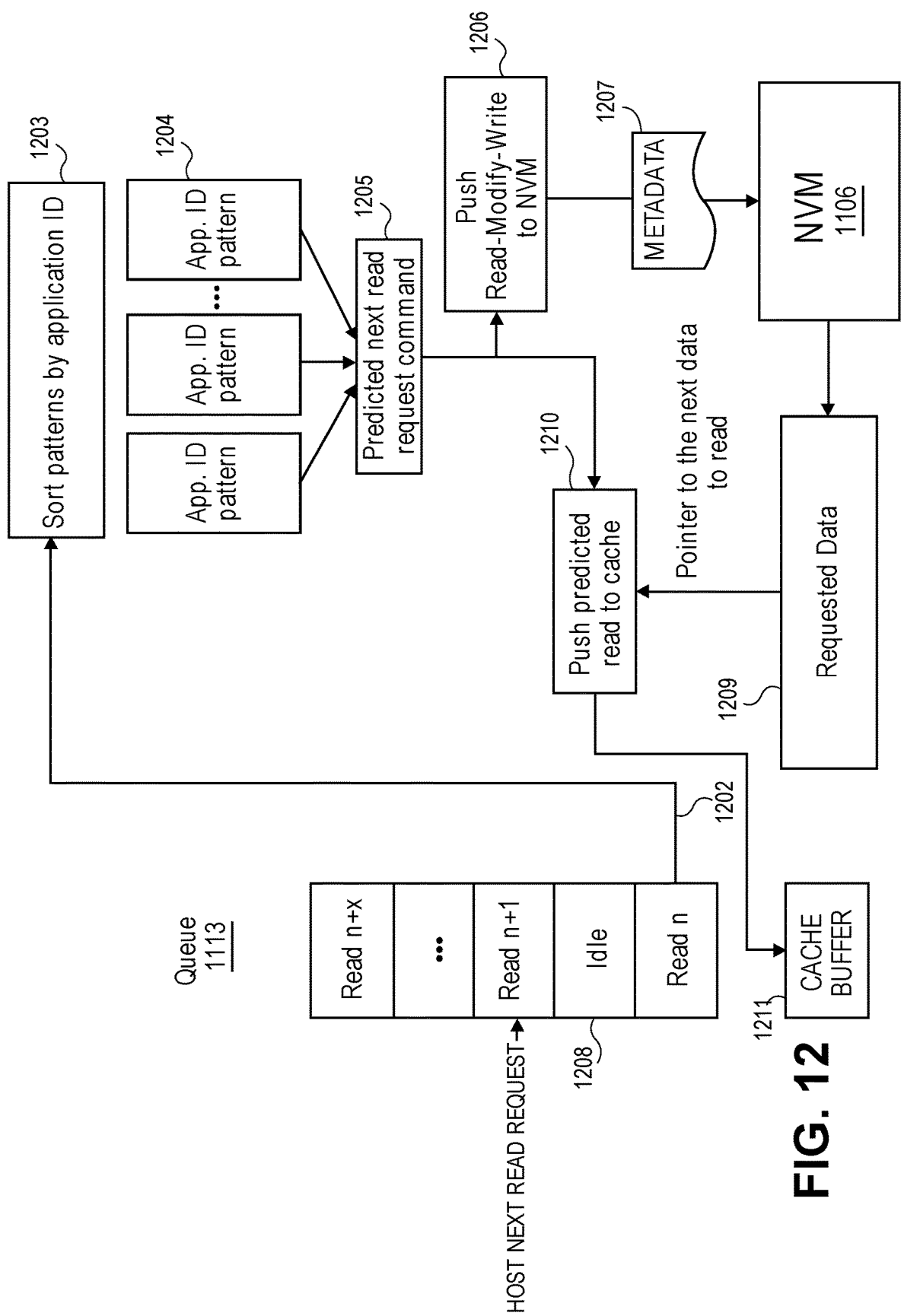
FIG. 12 illustrates an approach to reducing read time in an implementation.

FIG. 12 is a block diagram illustrating an approach to reducing read time, according to an embodiment. For example, such a process may be implemented in a multi-application and/or multi-host memory system environment. This approach or operation may be implemented to comprise two processes: (i) finding or identifying patterns underlying random read operations, distinguishing among processes, and (ii) predicting and updating data/metadata.

FIG. 12 depicts the read queue 1113, in which multiple host read requests or commands are placed or temporarily stored awaiting processing. For example, a series of received read requests "Read n", "Read n+1", through "Read n+x" are depicted in the read queue 1113, where n represents the read request next up (i.e., at the top of the queue) for processing and x represents an arbitrary number of read requests being held in the read queue 1113 at any given time. According to an embodiment, iteratively processing the current read request "Read n" (labeled as process 1202) involves sorting the read patterns, at block 1203, from the collection of read requests processed out of the read queue 1113, based on an application identifier ("ID") that identifies the application (e.g., executing on the host 1150 of FIG. 11)

from which request "Read n" originated. For example, the controller 1102 (FIG. 11) may maintain a table of the current application IDs that are active and, responsive to an incoming read request associated with a given application ID the controller 1102 monitors the read queue 1113 for a next read request "Read n+1" associated with that application ID. Thus, for each application ID, a corresponding read pattern is determined or identified, at block 1204

From the read patterns identified at block 1204, exclusive of any write requests, commands, or pattern(s) according to an embodiment (e.g., as read requests and write requests are often considered separately, in the context of system performance capabilities/metrics), a next read request is predicted (a prediction of "Read n+1"), at block 1205. From there, based on the next read request prediction of block 1205, an update to metadata 1207 corresponding to the "Read n" read request, including the next storage address corresponding to "Read n+1", is pushed to or stored in the NVM 1106, at block 1206. That is, the metadata 1207 in the NVM 1106 corresponding to the "Read n" request is updated with the next data storage address obtained from the next read request, i.e., the "Read n+1" request. As discussed and according to an embodiment, a "Read-Modify-Write" operation is utilized to push the "Read n" metadata update to the NVM 1106 at block 1206, such as in response to processing the "Read n+1" request from the read queue 1113 rather than in response to a host write command. Thus, while adding "extra" write operations, consequent benefits are manifested with respect to future read performance. Furthermore and according to an embodiment, the next data storage address updated in the metadata 1207 corresponding to the "Read n" request is a logical address (e.g., an LBA), rather than a physical address (e.g., a PBA), thus avoiding a performance hit associated with having to update the metadata 1207 in the NVM 1106 during garbage collection.

Therefore, based on the foregoing, each time another "Read n" read request is processed by the controller 1102 (FIG. 11), the "hint" or prediction of the storage location (e.g., the storage address) of the next read request "Read n+1" is available from the metadata 1207 associated with "Read n", and the "Read n+1" data can be pre-fetched from the NVM 1106 (FIG. 11) in advance of processing a following read request. Thus, if the prediction based on read patterns is accurate, then the data corresponding to the next read request, expected to be "Read n+1", is already available to the controller 1102 without having to execute a responsive read command at that time. According to an embodiment, in view of the read requests being sorted based on their respective application IDs (at block 1203), the metadata 1207 in the NVM 1106 that corresponds to "Read n" is updated to include the next storage address of "Read n+1" only in response to both the "Read n" and the "Read n+1" corresponding to the same application ID.

According to an embodiment, the "next data" 1209 from the next storage location of NVM 1106, identified from a previous "Read n+1" as highly likely to be the correct data, is fetched responsive to an occurrence of idle 1208 processing time corresponding to the read queue 1113. According to a related embodiment, the next data 1209 for the predicted next read request "Read n+1", such as that pre-fetched during the idle 1208 time, is placed or stored in a cache buffer 1211 (e.g., may be implemented within the memory 1110), at block 1210. Thus, the data corresponding to the next read request "Read n+1" is already available in the cache buffer 1211 without needing to execute a read command responsive to receiving again the next read request "Read n+1" and, therefore, can be returned to the host 1150 (FIG. 11) directly from the cache buffer 1211.

As a matter of implementation architecture, to maintain the foregoing procedure for multiple application IDs, it is preferable to maintain several "tracker" processes or processing threads so that each respective tracker can handle its own application ID and corresponding incoming read requests as well as corresponding "read ahead" requests and/or metadata updates.

Methods of Pre-Fetching Data

Figure 13:
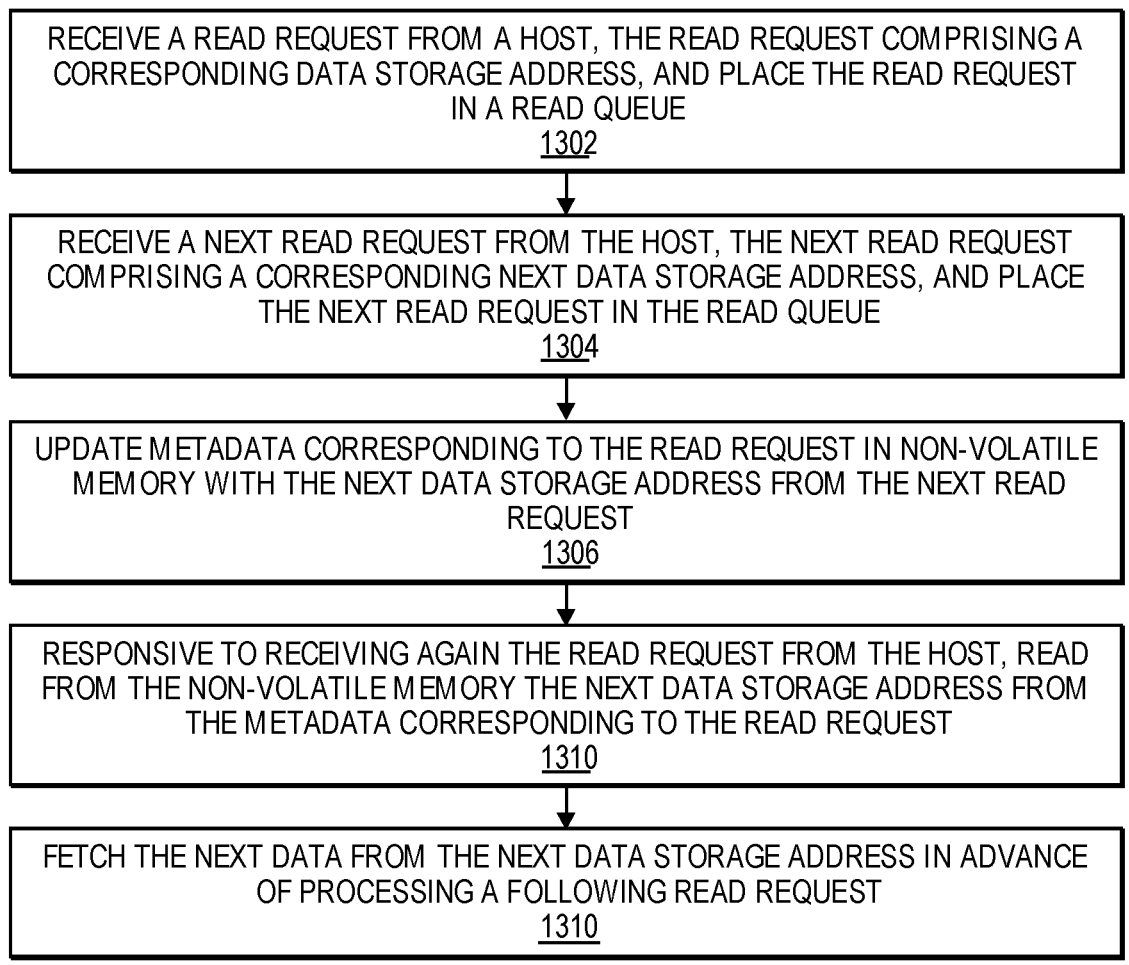
FIG. 13 illustrates a method of pre-fetching data in an implementation.

FIG. 13 is a flow diagram illustrating a method of pre-fetching data, according to an embodiment. The process or procedure of FIG. 13 may be implemented for execution as one or more sequences of instructions stored in one or more memory units and which, when executed by one or more processors, cause performance of the process. For example, the sequences of instructions stored in one or more memory units (e.g., memory 1110 of FIG. 11, or read-only memory (ROM) inherent to firmware) and which, when executed by one or more processors (e.g., processor 1112 of system controller 1102 of FIG. 11), can perform and/or cause performance of the process illustrated in FIG. 13.

At block 1302, a read request is received from a host, where the read request comprises a corresponding data storage address, and the read request is placed in a read queue. For example, read request "Read n" (FIG. 12) is received into the read queue 1113 (FIGS. 11-12) from the host 1150 (FIG. 11).

At block 1304, a next read request is received from the host, where the next read request comprises a corresponding next data storage address, and the next read request is placed in the read queue. For example, read request "Read n+1" (FIG. 12) is received into the read queue 1113 from the host 1150.

At block 1306, metadata corresponding to the read request is updated in non-volatile memory with the next data storage address from the next read request. For example, metadata 1207 corresponding to the read request "Read n" is updated in the NVM 1106 with the next data storage address from the next read request "Read n+1".

At block 1308, responsive to receiving again the read request from the host, the next data storage address form the metadata corresponding to the read request is read from the non-volatile memory. For example, responsive to receiving again the read request "Read n" from the host 1150, the next data storage address from the metadata 1207 (FIG. 12) corresponding to the read request "Read n" is read from the NVM 1106.

At block 1310, the next data from the next data storage address is fetched, in advance of processing a following read request from the read queue. For example, the next data from the next data storage address as read from the NVM 1106 at block 1308 is fetched, in advance of processing a following read request from the read queue, i.e., in anticipation that the following read request will indeed be read request "Read n+1" as predicted.

Figure 14:
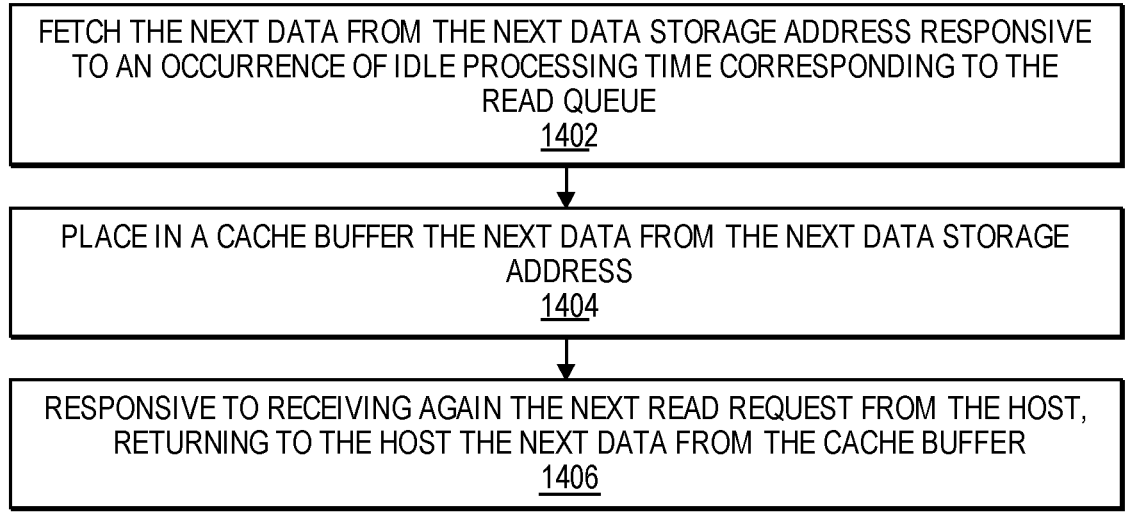
FIG. 14 illustrates a method of pre-fetching data to a read queue in an implementation.

FIG. 14 is a flow diagram illustrating a method of pre-fetching data to a read queue, according to an embodiment. As with FIG. 13, the process or procedure of FIG. 14 may be implemented for execution as one or more sequences of instructions stored in one or more memory units and which, when executed by one or more processors, cause performance of the process. For example, the sequences of instructions stored in one or more memory units (e.g., memory 1110 of FIG. 11, or read-only memory (ROM)

inherent to firmware) and which, when executed by one or more processors (e.g., processor 1112 of system controller 1102 of FIG. 11), can perform and/or cause performance of the process illustrated in FIG. 14, which can be understood as an optional continuing and/or augmenting process to the process of FIG. 13.

At block 1402, the next data from the next data storage address is fetched, responsive to an occurrence of idle processing time associated with or corresponding to the read queue. For example, the next data from the next data storage address, as read from the NVM 1106, is fetched from NVM 1106 during idle time, in anticipation of the following read request in read queue 1113 being read request "Read n+1" as predicted.

At block 1404, the next data from the next data storage address is placed in a cache buffer. For example, the next data that was fetched at block 1402, based on the next data storage address (originally from read request "Read n+1") from the metadata 1207 associated with the read request "Read n", is stored into the cache buffer 1211.

At block 1406, responsive to receiving again the next read request from the host, the next data is returned to the host from the cache buffer 1211. For example, responsive to receiving again the next read request "Read n+1" from the host 1150, the next data is read from the cache buffer 1211 and returned to the host 1150.

Such enhanced read-ahead technology provides various technical advantages, as may be evident from the foregoing description and illustrations. For example, pre-fetching data, e.g., ahead of a predicted next read request, increases read speeds. This may be especially beneficial in the case of random reads, which take a longer amount of time to complete because their data are scattered about on the media.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. An electronic device comprising:
a non-volatile storage medium;
a read queue; and
control circuitry coupled to the non-volatile storage medium and configured to:
receive a read request from a host, the read request comprising a corresponding data storage address, and place the read request in the read queue;
receive a next read request from the host, the next read request comprising a corresponding next data storage address, and place the next read request in the read queue;
sort read requests from one or more hosts based on an application identifier corresponding to each of the read requests;
update metadata corresponding to the read request in the non-volatile storage medium with the next data storage address from the next read request, only responsive to both the read request and the next read request corresponding to the same application identifier; and
fetch next data from the next data storage address responsive to an occurrence of idle processing time corresponding to the read queue.

2. The electronic device of claim 1, wherein the control circuitry is further configured to:
responsive to receiving again the read request from the host;
read from the non-volatile storage medium the next data storage address from the meta data corresponding to the read request; and
fetch the next data from the next data storage address in advance of processing a following read request.

3. The electronic device of claim 1, wherein the update of the metadata corresponding to the read request in the non-volatile storage medium is based on and responsive to the next read request, exclusive of a write request.

4. The electronic device of claim 1, wherein the next data storage address updated in the metadata corresponding to the read request is a logical block address (LBA) corresponding to the next read request.

5. The electronic device of claim 1, wherein the control circuitry is further configured to:
place in a cache buffer the next data from the next data storage address.

6. The electronic device of claim 5, wherein the control circuitry is further configured to:
responsive to receiving again the next read request from the host, return to the host the next data from the cache buffer.

7. The electronic device of claim 1, wherein the control circuitry is further configured to:
wherein the update of the metadata includes writing the next data storage address to the non-volatile storage medium utilizing a read-modify-write command.

8. The electronic device of claim 1, wherein the control circuitry is further configured to:
execute a respective tracker process corresponding to each different application identifier to update the metadata corresponding to read requests corresponding to each respective application identifier.

9. The electronic device of claim 1, wherein the electronic device is a data storage device.

10. A method comprising:
receiving a read request from a host, the read request comprising a corresponding data storage address, and placing the read request in a read queue;
receiving a next read request from the host, the next read request comprising a corresponding next data storage address, and placing the next read request in the read queue;
sorting read requests from one or more hosts based on an application identifier corresponding to each of the read requests;

updating metadata corresponding to the read request in non-volatile storage with a logical address corresponding to the next data storage address from the next read request, only responsive to both the read request and the next read request corresponding to the same application identifier; and fetching next data from the next data storage address responsive to an occurrence of idle processing time corresponding to the read queue.

11. The method of claim 10, further comprising:

responsive to receiving again the read request from the host:

reading from the non-volatile storage the next data storage address from the metadata corresponding to the read request; and fetching the next data from the next data storage address in advance of processing a following read request.

12. The method of claim 10, further comprising:

placing in a cache buffer the next data from the next data storage address.

13. The method of claim 12, further comprising:

responsive to receiving again the next read request from the host, returning to the host the next data from the cache buffer.

14. The method of claim 10, wherein the updating the metadata includes writing the logical address corresponding to the next data storage address to the non-volatile storage utilizing a read-modify-write command.

15. The method of claim 10, further comprising:

executing a respective tracker process corresponding to each different application identifier to update the metadata corresponding to read requests corresponding to each respective application identifier.

16. A computing system comprising:

means for receiving a read request from a host, the read request comprising a corresponding data storage address, and for placing the read request in a read queue;

means for receiving a next read request from the host, the next read request comprising a corresponding next data storage address, and for placing the next read request in the read queue;

means for sorting read requests from one or more hosts based on an application identifier corresponding to each of the read requests;

means for updating metadata corresponding to the read request in a non-volatile memory with the next data storage address from the next read request, only responsive to both the read request and the next read request corresponding to the same application identifier; and means for, responsive to receiving again the read request from the host;

reading from the non-volatile memory the next data storage address from the metadata corresponding to the read request; and fetching the next data from the next data storage address responsive to an occurrence of idle processing time corresponding to the read queue.

* * * * *